United States Patent [19]

Perner et al.

[11] 4,151,127

[45] Apr. 24, 1979

[54] PROCESS FOR SUPPRESSING THE FOAMING OF DETERGENTS

[75] Inventors: Johannes Perner, Neustadt; Guenter Frey, Boehl-Iggelheim; Herbert Helfert, Frankenthal; Rolf Fikentscher, Ludwigshafen, all of Fed. Rep. of Germany

[73] Assignee: BASF Aktiengesellschaft, Fed. Rep. of Germany

[21] Appl. No.: 883,217

[22] Filed: Mar. 3, 1978

[30] Foreign Application Priority Data

Mar. 10, 1977 [DE] Fed. Rep. of Germany ....... 2710355

[51] Int. Cl.² .......................... C11D 7/32; C11D 3/38; B01D 17/00
[52] U.S. Cl. .................................. 252/542; 252/89 R; 252/135; 252/321; 252/524; 252/531; 252/532; 252/535; 252/536; 252/538; 252/550; 252/551; 252/554; 252/555; 252/557; 252/558

[58] Field of Search .................. 252/89, 99, 135, 321, 252/524, 539, 542, 558; 544/196

[56] References Cited

U.S. PATENT DOCUMENTS

| | | | |
|---|---|---|---|
| 2,577,418 | 12/1951 | Hamm | 260/97.5 |
| 3,422,020 | 1/1969 | Schmadel et al. | 252/99 |
| 3,600,320 | 8/1971 | Schmadel et al. | 252/524 |
| 3,661,819 | 5/1972 | Koral et al. | 260/21 |
| 3,679,589 | 7/1972 | Schneegelberger et al. | 252/102 |
| 3,775,348 | 11/1973 | Sakobi et al. | 252/524 |
| 3,826,759 | 7/1976 | Inamorato et al. | 252/525 |
| 3,996,226 | 12/1976 | Savostianoff et al. | 260/249.6 |

FOREIGN PATENT DOCUMENTS

472677 4/1951 Canada.

*Primary Examiner*—P. E. Willis, Jr.
*Attorney, Agent, or Firm*—Keil & Witherspoon

[57] ABSTRACT

Certain melamine derivatives are added as anti-foam agents to detergents, cleaners and rinses.

2 Claims, No Drawings

PROCESS FOR SUPPRESSING THE FOAMING OF DETERGENTS

The present invention relates to a process for using melamine derivatives as anti-foam agents which are effective in anionic, non-ionic and cationic detergent and cleaner systems.

In the main, anionic surfactants which foam copiously are employed as the principal detergent constituents in domestic detergents for machine washing. To prevent the washing machine frothing over, thereby losing wash liquor, an anti-foam agent must be present. Conventionally, soaps, i.e. Na salts of fatty acids, are employed as the principal anti-foam agents. Na behenate in particular gives good results (German Pat. No. 1,056,316 and German Published Application DAS 1,080,250). When using such compounds, it is the alkaline earth metal salts of the fatty acids, especially the Ca salts, which act as the actual anti-foam agents. These ions are provided by the hardness in the water. If the water used contains insufficient alkaline earth metal cations, i.e. if it is soft, the required Ca soap cannot form to a sufficient degree. As a result, the washing machine will froth over. The second limitation of Ca behenate as an anti-foam agent is that even in hard water not all anionic surfactants are inhibited sufficiently. If a detergent liquor contains very powerful complexing agents, e.g. nitrilotriacetic acid, the great stability of the Ca nitrilotriacetic acid complexes again prevents the formation of anti-foam Ca soaps.

Other anti-foam agents of various chemical structures have also already been used in conjunction with detergents. German Published Application DAS 1,257,338 proposes the use of N-substituted melamines in which each of the three primary nitrogen atoms carries at least one hydrocarbon radical of 4 to 24 carbon atoms, as anti-foam agents. These agents again are not satisfactory, especially at high wash temperatures and when used at low concentrations ($<0.5\%$), since under these conditions the washing machines still frequently froth over.

German Published Application DAS 1,617,127 proposes the application of similar triazine derivatives in which, however, a dialkylamino group is replaced by chlorine. These compounds are also described as anti-foam agents, when used by themselves or in combination with those disclosed in German Published Application DAS 1,257,338. However, these again cannot be used for all types of detergents; in particular, when used in low concentrations they cannot suppress foaming in soft water.

It is an object of the present invention to provide anti-foam agents which are effective in particular at high washing temperatures (about 95° C.) and in very low concentrations and which can easily be manufactured industrially.

We have found that this object is achieved, surprisingly, by melamine derivatives of the formula I

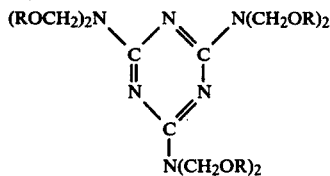

where from 25 to 100% of all radicals R are alkyl of 7 to 22 carbon atoms or acyl derived from an alkanecarboxylic acid or alkenecarboxylic acid of 7 to 22 carbon atoms and the remaining radicals R are alkyl of 1 to 4 carbon atoms. The derivatives are easily manufactured by reacting hexamethylolmelamine or hexamethylolmelamine monoalkyl to hexaalkyl ethers (where alkyl is of 1 to 4 carbon atoms), preferably the hexamethyl ether, with an aliphatic alcohol of 7 to 22 carbon atoms or an alkanecarboxylic or alkenecarboxylic acid of 7 to 22 carbon atoms, in the conventional manner.

Examples of suitable alcohols are heptanol, n-octanol, isooctanol, nonanol, decanol, dodecanol, tetradecanol, pentadecanol, stearyl alcohol, oxo-alcohol of 9/11 or 13/15 carbon atoms, Ziegler alcohol of 16/18 carbon atoms and mixtures of the various alcohols. Amongst these, the oxo-alcohols of 9/11 carbon atoms, oxo-alcohols of 13/15 carbon atoms and Ziegler alcohols of 16/18 carbon atoms, and the individual compounds stearyl alcohol and 2-ethylhexanol (isooctanol) are industrially of particular interest.

Examples of suitable carboxylic acids are enanthic acid, caprylic acid, isooctanoic acid (2-ethylhexanoic acid), pelargonic acid, capric acid, undecanoic acid, lauric acid, tridecanoic acid, myristic acid, pentadecanoic acid, palmitic acid, margaric acid, stearic acid, oleic acid, arachidic acid, tallow fatty acid, coconut fatty acid, behenic acid and mixtures of these. Amongst these, isooctanoic acid, myristic acid, stearic acid, behenic acid and mixtures of isooctanoic acid and stearic acid are of special interest, as explained in more detail below. The reaction between the alkyl ethers of hexamethylolmelamine—in the text which follows hexamethyl ether will be referred to, as being the preferred example—takes place in the presence of acidic agents or of Lewis acids. Examples of such agents are hydrochloric acid, oxalic acid, phosphorous acid, sulfuric acid and perchloric acid, on the one hand, and $BF_3$, $BF_3$-etherate and $ZnCl_2$, on the other. The amount used, based on the total batch, is from about 0.1 to 2% by weight, preferably from 0.3 to 0.6% by weight. The reaction is carried out at from about 120° to 190° C., depending on the chain length of the alcohols or carboxylic acids employed. The reaction time may vary from 1 to 20 hours depending on the number of methyl groups reacted.

The hexamethyl ether and alcohol or carboxylic acid react with one another in the molar ratio of from 1:1.5 to 1:6, i.e. in the case of the former ratio the alkyl or acyl radical with 7 to 22 carbon atoms is present to the extent of an average of 25%, and in the case of the last-mentioned ratio to the extent of 100%.

The above percentages are average values, i.e. if the reaction is carried out with a ratio of $1:<6$, mixtures of compounds are always obtained. Small amounts of oligomeric methylene-melamine ethers may also be formed during the reaction.

As stated above, the melamine derivatives are excellent anti-foam agents which are effective over a very wide range of temperatures and which, especially when mixed with one another, can even effect complete foam suppression over the entire relevant temperature range.

Some of the compounds, e.g. the staryl ester of hexamethylolmelamine (about 91% of stearyl), based on nitrogen valencies) also have the property of causing slight foaming in the lower and medium temperature ranges, which is frequently desirable, whilst they reduce foaming at high temperatures. Others, for example the isooctyl esters, are good anti-foam agents in the lower temperature ranges (at about 60° C. and below).

Mixtures of such compounds can be used for complete foam suppression.

The anti-foam agents to be used according to the invention are employed in amounts of from 0.5 to 20, preferably from 3 to 15, % by weight, based on the surfactant content of the detergent, or from 0.1 to 3, preferably from 0.5 to 2, % by weight, based on the complete detergent. The esters, in particular, are so active even at very low concentrations (<0.5%) that they prevent the frothing over of washing machines even when a hot laundering is carried out. For this reason, the esters are particularly preferred.

Products in which the sum of the carbon atoms in all the organic radicals exceeds 80 are particularly active.

The melamine derivatives exert an action on a broad range of anionic, non-ionic and cationic surfactants (including those where foam suppression is difficult), e.g. α-olefin-sulfonates, alkylbenzenesulfonates, secondary alkanesulfonates, α-sulfo-fatty acid esters, fatty alcohol sulfates, alkyl ether sulfates, oxyethylated alcohols, oxyalkylated alkylphenols, polyalkylene glycol ethers and quaternary ammonium salts.

They are also effective in the presence of powerful complexing agents, e.g. sodium nitrilotriacetate or a polyacrylate.

Of course not all melamine derivatives are equally good anti-foam agents, and above all some ethers are less good than others, but the new category of compounds makes it possible to obtain the correct foam height for all special purposes, i.e. tailor-made foam regulators can be prepared by appropriate combination of compounds.

The compounds may be used for a range of purposes extending from domestic washing processes to rinsing processes and from industrial cleaning processes to disinfectant cleaning processes.

The Examples which follow illustrate the invention.

(A) PROCESS OF MANUFACTURE

(a) Instructions for the Manufacture of Melamine Ethers

The hexamethylolmelamine hexamethyl ether and the alcohol in question are condensed in the stated molar ratio, in the presence of catalytic amounts (0.4–0.6% by weight) of concentrated hydrochloric acid, phosphorous acid or oxalic acid, in a 1 liter three-necked flask equipped with a stirrer, contact thermometer and reflux condenser, by stirring for 1 hour at the stated temperature, and the low-boiling alcohol is distilled off under reduced pressure.

For example, the following compounds of the formula I are manufactured in accordance with the above instructions.

| Example | | | | | Molar ratio of ether to alcohol | Reaction time [hours] | Reaction temperature [° C.] |
|---|---|---|---|---|---|---|---|
| 1 | 6R | = 1.5 | $C_9C_{11}H_{19}H_{23}-$ | + 4.5 $CH_3-$ | 1 : 1.5 | 1 | 160 |
| 2 | 6R | = 3.0 | $C_9C_{11}H_{19}H_{23}-$ | + 3.0 $CH_3-$ | 1 : 3 | 1 | 170 |
| 3 | 6R | = 4.5 | $C_9C_{11}H_{19}H_{23}-$ | + 1.5 $CH_3-$ | 1 : 4.5 | 1 | 190 |
| 4 | 6R | = 1.5 | $C_{13}C_{15}H_{27}H_{31}-$ | + 4.5 $CH_3-$ | 1 : 1.5 | 1 | 140 |
| 5 | 6R | = 3.0 | $C_{13}C_{15}H_{27}H_{31}-$ | + 3.0 $CH_3-$ | 1 : 3 | 1 | 140 |
| 6 | 6R | = 4.5 | $C_{13}C_{15}H_{27}H_{31}-$ | + 1.5 $CH_3-$ | 1 : 4.5 | 1 | 140 |
| 7 | 6R | = 1.5 | $C_{16}C_{18}H_{33}H_{37}-$ | + 4.5 $CH_3-$ | 1 : 1.5 | 1 | 170 |
| 8 | 6R | = 3.0 | $C_{16}C_{18}H_{33}H_{37}-$ | + 3.0 $CH_3-$ | 1 : 3 | 1 | 140 |
| 9 | 6R | = 4.5 | $C_{16}C_{18}H_{33}H_{37}-$ | + 1.5 $CH_3-$ | 1 : 4.5 | 1 | 140 |
| 10 | 6R | = 5.5 | $C_{18}H_{35}-$ | + 0.5 $CH_3-$ | 1 : 5.5 | 1 | 170 |
| 11 | 6R | = 5.5 | $C_{12}C_{15}H_{25}H_{31}-$ | + 0.5 $CH_3-$ | 1 : 5.5 | 1 | 170 |

Elementary analyses were carried out on the products of Examples 4, 6 and 9:

| Product | Empirical formula | | Composition, % | | |
|---|---|---|---|---|---|
| 4 | $C_{55.5}H_{111}N_6O_6$ (958.3) | Calculated Found | C 69.55 C 70.30 | H 11.66 H 11.50 | N 8.77 N 10.30 |
| 6 | $C_{71.5}H_{142.5}N_6O_6$ (1,179.2) | Calculated Found | C 72.57 C 73.10 | H 12.17 H 12.10 | N 7.13 N 8.20 |
| 9 | $C_{91.5}H_{183}N_6O_6$ (1,463.1) | Calculated Found | C 75.11 C 74.6 | H 12.59 H 12.6 | N 5.74 N 6.3 |

(b) Instructions for the Manufacture of the Melamine Esters

The hexamethylolmelamine hexamethyl ether and the relevant carboxylic acid, mixed in the stated molar ratio, are treated with 0.3–0.6% by weight of hydrochloric acid, phosphorous acid or oxalic acid in a 1 liter three-necked flask equipped with a stirrer, contact thermometer and reflux condenser. The low-boiling alcohol is then distilled off under reduced pressure from a waterpump vacuum, in the course of the stated reaction time, at the stated temperature.

The following compounds of the formula I may be obtained in accordance with the above instructions:

| Example | | | | | Molar ratio of hexamethylolmelamine to carboxylic acid | Reaction time [hours] | Reaction temperature [° C.] |
|---|---|---|---|---|---|---|---|
| 12 | 6R | = 1.5 | i-$C_7H_{15}CO-$ | + 4.5 $CH_3-$ | 1 : 1.5 | 3 | 140 |
| 13 | 6R | = 3.0 | i-$C_7H_{15}CO-$ | + 3.0 $CH_3-$ | 1 : 3 | 2 | 130 |
| 14 | 6R | = 4.5 | i-$C_7H_{15}CO-$ | + 1.5 $CH_3-$ | 1 : 4.5 | 2 | 130 |
| 15 | 6R | = 1.5 | $C_{11}H_{23}CO-$ | + 4.5 $CH_3-$ | 1 : 1.5 | 2 | 120 |
| 16 | 6R | = 3.0 | $C_{11}H_{23}CO-$ | + 3.0 $CH_3-$ | 1 : 3 | 2 | 130 |
| 17 | 6R | = 4.5 | $C_{11}H_{23}-CO-$ | + 1.5 $CH_3-$ | 1 : 4.5 | 5 | 190 |
| 18 | 6R | = 1.5 | $C_{17}H_{35}-CO-$ | + 4.5 $CH_3-$ | 1 : 1.5 | 1 | 150 |
| 19 | 6R | = 3.0 | $C_{17}H_{35}-CO-$ | + 3.0 $CH_3-$ | 1 : 3 | 2.5 | 150 |
| 20 | 6R | = 4.5 | $C_{17}H_{35}-CO-$ | + 1.5 $CH_3-$ | 1 : 4.5 | 4 | 180 |

-continued

| Example | | | | Molar ratio of hexamethylolmelamine to carboxylic acid | Reaction time [hours] | Reaction temperature [° C.] |
|---|---|---|---|---|---|---|
| 21 | 6R = 5.5 | $C_{17}H_{35}$—CO— | + 0.5 $CH_3$— | 1 : 5.5 | 6 | 160 |
| 22 | 6R = 5.5 | i-$C_7H_{15}$—CO— | + 0.5 $CH_3$— | 1 : 5.5 | 17 | 190 |
| 23 | 6R = 5.5 | $C_{13}H_{27}$—CO— | + 0.5 $CH_3$— | 1 : 5.5 | 5 | 130 |
| 24 | 6R = 3.5 | $C_{21}H_{43}$—CO— | + 0.5 $CH_3$— | 1 : 5.5 | 5 | 140 |
| 25 | 6R = 5.5 | [(i-$C_7H_{15}$—CO—) : ($C_{17}H_{35}$—CO—) = 1 : 1 molar] | + 0.5 $CH_3$— | 1 : 5.5 | 14 | 140 |
| 26 | 6R = 5.5 | [i-$C_7H_{15}$—CO—) : ($C_{17}H_{35}$—CO—) = 2 : 1 molar] | + 0.5 $CH_3$— | 1 : 5.5 | 10 | 140 |

Elementary analyses were carried out on the products obtained as described in Examples 15, 21, 22 and 23–25:

| Product code | Empirical formula | | Composition, % | | |
|---|---|---|---|---|---|
| 22 | $C_{53.5}H_{96}N_6O_{11.5}$ | Calc. | C 63.80 | H 9.60 | N 8.34 |
| | (1,007.1) | Found | C 63.10 | H 9.60 | N 9.20 |
| 15 | $C_{64.5}H_{120}N_6O_{10.5}$ | Calc. | C 67.51 | H 10.53 | N 7.32 |
| | (1,147.4) | Found | C 67.10 | H 10.70 | N 8.20 |
| 23 | $C_{86.5}H_{162}N_6O_{11.5}$ | Calc. | C 70.67 | H 11.09 | N 5.71 |
| | (1,469.9) | Found | C 69.50 | H 11.30 | N 6.00 |
| 24 | $C_{130.5}H_{250}N_6O_{11.5}$ | Calc. | C 75.09 | H 12.06 | N 4.03 |
| | (2,086.9) | Found | C 74.80 | H 12.30 | N 4.05 |
| 21 | $C_{108.5}H_{206}N_6O_{11.5}$ | Calc. | C 73.27 | H 11.66 | N 4.72 |
| | (1,778.4) | Found | C 72.4 | H 11.80 | N 5.30 |
| 25 | $C_{81}H_{151}N_6O_{11.5}$ | Calc. | C 69.85 | H 10.92 | N 6.03 |
| | (1,392.8) | Found | C 70.8 | H 11.4 | N 5.20 |

(B) TESTING THE ANTI-FOAM AGENTS

The preliminary testing of these products was carried out in a "dynamic foam test apparatus" as described in German Pat. No. 1,257,338, under the following test conditions:
Amount of liquor: 7 l
Water hardness: 16° German hardness
Detergent concentration: 7 g/l Detergent Composition 7% of anionic surfactant
5% of tallow fatty alcohol reacted with 11 moles of ethylene oxide
3% of soap (behenate-free)
40% of pentasodium triphosphate
20% of Na perborate
10% of Na sulfate
2% of anti-foam agent
remainder water Anionic Surfactant (a) Alpha-olefin-sulfonate
(b) Alkylbenzenesulfonate The "dynamic foam test apparatus" simulates the washing process of a drum-type washing machine, so that it can be used for a rough preselection of suitable and unsuitable anti-foam agents.

The results in the "dynamic foam test apparatus" (Table 1) clearly show the anti-foam action of the hexamethylolmelamine derivatives obtained as described in Examples 1 to 9.

However, predictions of behavior under practical conditions can only be made if the test is carried out in a drum-type washing machine:

For this, the following conditions were selected:
washing machine: Miele W 437
cycle: boil (for heavy soiling), without prewash
load: 2 kg of clean linen towels
amount of liquor: 15 l
liquor rate: 7.5:1
detergent concentration: 7 g/l Detergent Composition 7% of anionic surfactant
5% of tallow fatty alcohol reacted with 11 moles of ethylene oxide
3% of soap (behenate-free), chain length range $C_{12}$–$C_{18}$
40% of complexing agent
20% of Na perborate
10% of Na sulfate
1% of anti-foam agent
remainder water.

The anionic surfactants selected wer an α-olefin-sulfonate (of 14 to 16 carbon atoms), an alkylbenzenesulfonate (where alkyl is of 11 to 13 carbon atoms), a secondary alkanesulfonate (of 13 to 18 carbon atoms), an α-sulfo-fatty acid ester (based on palm kernel fatty acid) and a fatty alcohol-sulfate (of 16 to 18 carbon atoms).

The complexing agents employed are pentasodium triphosphate and a 3:1 mixture of the latter with sodium nitrilotriacetate.

The foam properties are given figures of merit from 0 to 6:
0=foam below the sight glass
1 to 3=foam at the sight glass
4=drum filled with foam
5=foam at the filling tube
6=frothing over.

Table 2 shows the anti-foam action of the compound of Example 6 in heavy duty detergents based on various anionic surfactants, as a function of the water hardness and of the complex-forming system. Table 2 shows that using the hexamethylolmelamine derivative of Example 6, foaming can in virtually all the tested cases be restricted to safe levels. Detergent formulations containing fatty alcohol-sulfate in some cases froth over at 95° C. The results clearly show that the anti-foam action of the agent of Example 6 is independent of the water hardness, in contrast to the action of Na behenate.

The basic suitability of hexamethylolmelamine esters for use as anti-foam agents is apparent from Table 3. The test conditions corresponded to those given in Table 1; the compounds of Example 12 to 21 were tested.

Table 3 especially shows the suitability of the compound of Example 21, by means of which complete absence of foam is achievable, especially in the critical upper temperature range.

Acyl derivatives of hexamethylolmelamine, with chain lengths in the range from 7 to 12 carbon atoms, especially have an anti-foam action in the lower temperature range.

The outstanding effectiveness, under practical conditions, of the compound of Example 21 is apparent from Table 4. Foaming is restricted to safe levels over the entire temperature range, regardless of the water hardness, the complexing agent used and the surfactant used. In the lower temperature range, only slight foaming is detectable. This slight foaming may in some cases be entirely desirable. In the upper temperature range, freedom from foam is achieved in every case.

If the foam-inibiting action of the product of Example 21 is observed as a function of the amount of anti-foam agent employed, it is found that even at a concentration of 0.05%, based on the detergent employed, frothing-over of the washing machine can be prevented in most cases. Details are shown in Table 5.

Table 6 shows the dependence of the anti-foam action on the chain length of the fatty acid used. For example, if the 2-ethyl hexanoic acid ester is used (Example 22), foaming cannot be suppressed in every case in the upper temperature range. The corresponding myristic acid derivative allows slight foaming to occur in the lower temperature range only. On the other hand, if the behenic acid derivative (Example 24) is used, vigorous foaming occurs in the middle temperature range, whilst in the upper temperature range ther is again no foaming. In view of the fact that the derivatives of relatively short-chain fatty acids suppress foaming in the lower temperature range whilst derivatives of long-chain fatty acids display their full activity in the upper temperature range, it was possible to deduce that any desired pattern of foaming would be obtainable by combining various fatty acids. The experiments with the anti-foam agents of Examples 25 and 26 in Table 6 confirm this supposition. By combining fatty acids of 8 carbon atoms and of 18 carbon atoms in the molar ratio of 1:1, absence of foam is achieved over the entire temperature range. If the same fatty acids are employed in the ratio of 2:1, there is no foaming in the lower temperature range and only relatively moderate foaming in the upper temperature range.

Table 7 illustrates the effect of methylolmelamine esters on detergents based on non-ionic surfactants. The test conditions for the experiments in Table 7 were as follows:
- washing machine: Miele 421 S
- cycle: boil (for heavy soiling), without prewash
- water hardness: 5° German hardness
- load: 2 kg of clean linen towels
- amount of liquor: 15 l
- liquor ratio: 7.5:1
- detergent concentration: 5 g/l Detergent Composition 8% of a fatty alcohol mixture of 13 and 15 carbon atoms reacted with 10 moles of ethylene oxide
40% of pentasodium triphosphate
10% of Na metasilicate×5 $H_2O$
20% of Na perborate
10% of Na carbonate
12% of Na sulfate Dishwashing Agents The anti-foam agents of the invention also display their activity when employed in mechanical dishwashing formulations. Table 8 shows the results of tests with the products of Examples 6 and 21. These tests were carried out in a dishwashing machine in the presence of protein food residues.

Test Conditions

Dishwashing machine: Miele G 50
protein food residues: 10 ml of fresh chicken's egg
amount of dishwashing agent: 20 g Composition of Dishwashing Agent 19 g of a builder (comprising 50% of sodium metasilicate×5 $H_2O$, 45% of pentasodium triphosphate and 5% of Na carbonate), 1 g of surfactant (containing 2% of anti-foam agent, corresponding to 0.1% in the composite dishwashing agent)

Surfactant (a) oxo-alcohol of 9/11 carbon atoms reacted with 7 moles of ethylene oxide
(b) block polymer of 60% of propylene oxide and 40% of ethylene oxide; molecular weight 3,000
(c) block polymer of 80% of propylene oxide and 20% of ethylene oxide; molecular weight 2,500
(d) oxo-alcohol of 13/15 carbon atoms reacted with 12 moles of ethylene oxide.

A quantitative measure of the foaming in the dishwashing machine is obtained by measuring the rate of revolution of the spray arm. Low rates indicate a large amount of foam and high rates correspond to a small amount of foam. Table 8 shows that the amount of foam from relatively heavily foaming non-ionic surfactants as well as from non-ionic surfactants which are regarded as low-foaming, can be reduced effectively.

Cationic Formulations

Disinfectant cleaners use cationic surfactants, eg. dimethyl-dodecyl-benzyl-ammonium chloride, the copious foaming of which, above all under high mechanical stress, is undesirable. If the hexamethylolmelamine derivatives of the invention are employed in such cleaner formulations, the foam can be reduced, the degree depending on the nature of the anti-foam agent employed. Table 9 shows the effect of these agents on aqueous solutions of dimethyl-dodecyl-benzyl-ammonium chloride. The test was carried out as described in DIN 53,902, the surfactant solution being foamed by whipping with a perforated disc in a measuring cylinder.

Test Conditions

Surfactant concentration: 2.5 g/l
water hardness: 0° German hardness
concentration of anti-foam agent: 1 g/l Table 10 shows results obtained with products of German Published Application DAS 1,257,338 and German Pat. No. 1,617,127.

These products have the formulae II and III, respectively.

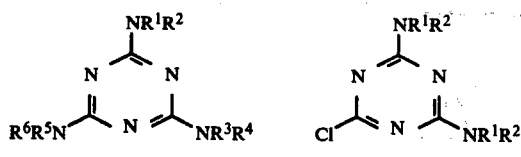

II  III

The following compounds of formula II were tested:

| Comparative Example | R¹ | R² | R³ | R⁴ | R⁵ | R⁶ |
|---|---|---|---|---|---|---|
| a | H | C₁₈H₃₇ | H | C₁₈H₃₇ | H | C₁₈H₃₇ |
| b | all alkyl of 16 to 20 carbon atoms | | | | | |
| c | all alkyl of 16 to 18 carbon atoms | | | | | |

| Comparative Example | R¹ | R² | R³ | R⁴ | R⁵ | R⁶ |
|---|---|---|---|---|---|---|
| d | all coconut fatty alkyl | | | | | |

The following compounds of formula III were tested:

| | R¹ to R⁴ |
|---|---|
| e | coconut fatty alkyl |
| f | C₁₈H₃₇ |
| g | tallow fatty alkyl |

These products were compared with the product of Example 21. The product according to the invention was found to be superior, above all at low concentrations.

TABLE 1

Foaming in the "dynamic foam test apparatus"
Anti-foam agents of Examples 1 to 9

Foam height mm

| Anti-foam agent Surfactant | 1 AOS | 2 AOS | 3 AOS | 4 AOS | 5 AOS | 6 AOS | 7 AOS | 8 AOS | 9 AOS | + AOS | 6 ABS | — ABS |
|---|---|---|---|---|---|---|---|---|---|---|---|---|
| 25° C. | 0 | 0 | 0 | 0 | 0 | 0 | 20 | 20 | 20 | 50 | 0 | 60 |
| 30° C. | 0 | 0 | 0 | 0 | 0 | 0 | 30 | 0 | 10 | 60 | 0 | 50 |
| 35° C. | 0 | 0 | 0 | 0 | 0 | 0 | 0 | 0 | 0 | 70 | 0 | 0 |
| 40° C. | 0 | 0 | 0 | 0 | 0 | 0 | 0 | 0 | 20 | 70 | 0 | 0 |
| 45° C. | 0 | 0 | 10 | 40 | 0 | 0 | 20 | 0 | 20 | 80 | 0 | 0 |
| 50° C. | 0 | 0 | 20 | 40 | 0 | 0 | 20 | 0 | 0 | 90 | 0 | 0 |
| 55° C. | 20 | 0 | 30 | 40 | 0 | 20 | 30 | 0 | 0 | 100 | 0 | 40 |
| 60° C. | 20 | 20 | 30 | 40 | 20 | 30 | 20 | 0 | 0 | 100 | 0 | 40 |
| 65° C. | 20 | 20 | 30 | 40 | 20 | 30 | 20 | 0 | 0 | 80 | 0 | 40 |
| 70° C. | 20 | 30 | 30 | 40 | 20 | 30 | 20 | 0 | 0 | 70 | 0 | 40 |
| 75° C. | 30 | 30 | 30 | 40 | 20 | 30 | 30 | 0 | 20 | 50 | 0 | 40 |
| 80° C. | 30 | 35 | 30 | 40 | 30 | 30 | 30 | 0 | 40 | 50 | 20 | 40 |
| 85° C. | 30 | 35 | 30 | 40 | 30 | 30 | 40 | 10 | 50 | 70 | 20 | 45 |
| 90° C. | 30 | 35 | 30 | 50 | 30 | 40 | 180 | 20 | 70 | 130 | 30 | 70 |
| 95° C. | 50 | 35 | 30 | 90 | 30 | 40 | 260 | 140 | 120 | 260 | 30 | 170 |

AOS = alpha-olefin-sulfonate
ABS = alkylbenzenesulfonate
+ = blank experiment

TABLE 2

Foaming in a drum-type washing machine
Anti-foam agent of Example 6

| Water hardness Complexing agent Surfactant | 5° German hardness STP | | | | 16° German hardness STP | | | | 5° German hardness STP/NTA (3 : 1) | | | | 16° German hardness STP/NTA (3 : 1) | | | |
|---|---|---|---|---|---|---|---|---|---|---|---|---|---|---|---|---|
| | AOS | ABS | SAS | FSE | AOS | ABS | SAS | FSE | AOS | ABS | SAS | FSE | AOS | ABS | SAS | FSE |
| 25° C. | 0 | 0 | 0 | 0 | 0 | 0 | 0 | 0 | 0 | 0 | 0 | 0 | 0 | 0 | 0 | 0 |
| 30° C. | 0 | 0 | 0 | 0 | 0 | 0 | 0 | 0 | 0 | 0 | 0 | 0 | 0 | 0 | 0 | 0 |
| 35° C. | 0 | 0 | 0 | 0 | 0 | 0 | 0 | 0 | 0 | 0 | 0 | 0 | 0 | 0 | 0 | 0 |
| 40° C. | 0 | 0 | 0 | 0 | 0 | 0 | 0 | 0 | 0 | 0 | 0 | 0 | 0 | 0 | 0 | 0 |
| 45° C. | 0 | 0 | 0 | 0 | 0 | 0 | 0 | 0 | 0 | 0 | 0.5 | 0 | 0 | 0 | 0 | 0 |
| 50° C. | 0 | 0 | 0 | 0 | 0 | 0 | 0 | 0 | 0 | 0 | 1 | 0 | 0 | 0 | 0 | 0 |
| 55° C. | 0 | 0 | 0 | 0 | 0 | 0 | 0 | 0 | 0 | 0.5 | 1.5 | 0 | 0 | 0 | 0.5 | 0 |
| 60° C. | 0 | 0.5 | 0.5 | 0 | 0 | 0 | 0 | 0 | 0 | 1 | 2 | 0 | 0 | 0.5 | 1 | 0 |
| 65° C. | 0 | 0.5 | 0.5 | 0 | 0 | 0 | 0 | 0 | 0 | 1 | 3 | 0 | 0 | 0.5 | 1 | 0 |
| 70° C. | 0 | 1 | 1.5 | 0 | 0 | 0.5 | 0.5 | 0 | 0 | 1.5 | 3.5 | 0 | 0 | 1 | 1.5 | 0 |
| 75° C. | 0.5 | 1.5 | 2 | 0.5 | 0 | 0.5 | 0.5 | 0 | 0.5 | 1.5 | 4 | 0.5 | 0.5 | 1 | 1.5 | 0 |
| 80° C. | 0.5 | 1.5 | 2 | 1 | 0.5 | 1 | 1 | 0 | 0.5 | 2 | 5 | 1 | 0.5 | 1.5 | 1.5 | 0.5 |
| 85° C. | 0.5 | 1.5 | 2.5 | 1 | 0.5 | 1 | 1 | 0.5 | 1.5 | 2 | 5 | 1.5 | 0.5 | 1.5 | 2 | 0.5 |
| 90° C. | 1 | 1.5 | 2.5 | 1 | 0.5 | 1 | 1.5 | 0.5 | 1.5 | 2 | 5 | 2 | 1 | 1.5 | 2 | 1 |
| 95° C. | 1.5 | 2 | 2.5 | 1 | 1 | 1 | 1.5 | 0.5 | 2 | 2.5 | 5 | 2.5 | 1 | 1.5 | 2 | 1.5 |

NTA = trisodium nitrilotriacetate
AOS = alpha-olefin sulfonate
STP = pentasodium triphosphate
ABS = alkylbenzenesulfonate
SAS = secondary alkanesulfonate
FSE = alpha-sulfo-fatty acid ester

TABLE 3

Foaming in the "dynamic foam test apparatus"
Anti-foam agents of Examples 12 to 21

| Anti-foam agent Surfactant | Foam height mm | | | | | | | | | | |
|---|---|---|---|---|---|---|---|---|---|---|---|
| | 12 AOS | 13 AOS | 14 AOS | 15 AOS | 16 AOS | 17 AOS | 18 AOS | 19 AOS | 20 AOS | 21 AOS | Blank value |
| 25° C. | 0 | 0 | 0 | 0 | 0 | 0 | 20 | 20 | 50 | 10 | 50 |
| 30° C. | 0 | 0 | 0 | 0 | 0 | 0 | 30 | 30 | 50 | 30 | 60 |
| 35° C. | 0 | 0 | 0 | 0 | 0 | 0 | 45 | 0 | 50 | 50 | 70 |
| 40° C. | 0 | 0 | 0 | 0 | 0 | 0 | 40 | 0 | 50 | 50 | 70 |
| 45° C. | 0 | 0 | 0 | 0 | 0 | 0 | 20 | 0 | 40 | 40 | 80 |
| 50° C. | 0 | 0 | 0 | 10 | 0 | 0 | 0 | 30 | 35 | 40 | 90 |
| 55° C. | 0 | 20 | 0 | 30 | 0 | 0 | 0 | 20 | 20 | 40 | 100 |
| 60° C. | 20 | 20 | 20 | 30 | 0 | 0 | 0 | 0 | 0 | 20 | 100 |
| 65° C. | 30 | 30 | 0 | 30 | 0 | 0 | 0 | 0 | 0 | 20 | 80 |
| 70° C. | 40 | 35 | 30 | 30 | 0 | 0 | 20 | 0 | 0 | 0 | 70 |
| 75° C. | 40 | 40 | 30 | 50 | 0 | 10 | 35 | 0 | 0 | 0 | 50 |
| 80° C. | 30 | 20 | 40 | 50 | 20 | 20 | 40 | 0 | 0 | 0 | 50 |
| 85° C. | 30 | 30 | 35 | 80 | 20 | 30 | 35 | 20 | 0 | 0 | 70 |
| 90° C. | 20 | 30 | 20 | 170 | 40 | 40 | 30 | 20 | 0 | 0 | 130 |
| 95° C. | 40 | 30 | 40 | 260 | 180 | 180 | 30 | 20 | 20 | 0 | 260 |

AOS = alpha-olefin-sulfonate

TABLE 4

Foaming in a drum-type washing machine. Anti-foam agent of Example 21

| Water hardness Complexing agent Surfactant | 5° German hardness STP | | | | | 16° German hardness STP | | | | | 5° German hardness STP/NTA (3:1) | | | | | | 16° German hardness STP/NTA (3:1) | | | | |
|---|---|---|---|---|---|---|---|---|---|---|---|---|---|---|---|---|---|---|---|---|---|
| | AOS | ABS | SAS | FSE | FAS | AOS | ABS | SAS | FSE | FAS | AOS | ABS | SAS | FSE | FAS | AAS | AOS | ABS | SAS | FSE | FAS |
| 25°C. | 0 | 0 | 0 | 0 | 0.5 | 0 | 0 | 0.5 | 0 | 0 | 0 | 0 | 0 | 0 | 0 | 0.5 | 0 | 0 | 0 | 0 | 0 |
| 30°C. | 0 | 0.5 | 0.5 | 0 | 0.5 | 0 | 0 | 1 | 0 | 0 | 0 | 0 | 0.5 | 0 | 0 | 0 | 0 | 0 | 0 | 0 | 0 |
| 35°C. | 0.5 | 1 | 0.5 | 0 | 0.5 | 0.5 | 0.5 | 1 | 0 | 0 | 0 | 0 | 0.5 | 0 | 0 | 0 | 0.5 | 0.5 | 0 | 0 | 0 |
| 40°C. | 1 | 1 | 0.5 | 0 | 0.5 | 0.5 | 0.5 | 1 | 0 | 0 | 0.5 | 1 | 0.5 | 0 | 0.5 | 0 | 0.5 | 0.5 | 0 | 0 | 0 |
| 45°C. | 1 | 1 | 1 | 0 | 1 | 0 | 1 | 1 | 0 | 0.5 | 0.5 | 1 | 1 | 0 | 1.5 | 0.5 | 1 | 1 | 0.5 | 0 | 0.5 |
| 50°C. | 1.5 | 1.5 | 1 | 0 | 1 | 0 | 0.5 | 1 | 0 | 0.5 | 0 | 1.5 | 2 | 0 | 1.5 | 1.5 | 0.5 | 0.5 | 1 | 0 | 0 |
| 55°C. | 0.5 | 1.5 | 1.5 | 0 | 1.5 | 0 | 0 | 0.5 | 0 | 0 | 0 | 1 | 2.5 | 0 | 2 | 1.5 | 0 | 0 | 0.5 | 0 | 0 |
| 60°C. | 0 | 0 | 2 | 0 | 0.5 | 0 | 0 | 0.5 | 0 | 0 | 0 | 0 | 2.5 | 0 | 1.5 | 0 | 0 | 0 | 0 | 0 | 0.5 |
| 65°C. | 0 | 0 | 1.5 | 0 | 0 | 0 | 0 | 0 | 0 | 0 | 0 | 0 | 0.5 | 0 | 1 | 0 | 0 | 0 | 0 | 0 | 0 |
| 70°C. | 0 | 0 | 0 | 0 | 0 | 0 | 0 | 0 | 0 | 0 | 0 | 0 | 0 | 0 | 1 | 0 | 0 | 0 | 0 | 0 | 0 |
| 75°C. | 0 | 0 | 0 | 0 | 0 | 0 | 0 | 0 | 0 | 0 | 0 | 0 | 0 | 0 | 1 | 0 | 0 | 0 | 0 | 0 | 0 |
| 80°C. | 0 | 0 | 0 | 0 | 0 | 0 | 0 | 0 | 0 | 0 | 0 | 0 | 0 | 0 | 0.5 | 0 | 0 | 0 | 0 | 0 | 0 |
| 85°C. | 0 | 0 | 0 | 0 | 0 | 0 | 0 | 0 | 0 | 0 | 0 | 0 | 0 | 0 | 0 | 0 | 0 | 0 | 0 | 0 | 0 |
| 90°C. | 0 | 0 | 0 | 0 | 0 | 0 | 0 | 0 | 0 | 0 | 0 | 0 | 0 | 0 | 0 | 0 | 0 | 0 | 0 | 0 | 0 |
| 95°C. | 0 | 0 | 0 | 0 | 0 | 0 | 0 | 0 | 0 | 0 | 0 | 0 | 0 | 0 | 0 | 0 | 0 | 0 | 0 | 0 | 0 |

STP = pentasodium triphosphate, NTA = trisodium nitrilotriacetate,
AOS = alpha-olefin-sulfonate,
ABS = alkylbenzenesulfonate, SAS = alkanesulfonate,
FSE = alpha-sulfo-fatty acid ester,
FAS = fatty alcohol sulfate,
AAS = alkyl ether-sulfate

TABLE 5

Foaming in a drum-type washing machine. Anti-foam agent of Example 21, concentration series

| Water hardness<br>Complexing agent<br>Surfactant<br>Concentration of anti-foam agents | 5° German hardness STP AOS | | | 5° German hardness STP/NTA (3:1) AOS | | | 5° German hardness STP SAS | | | 5° German hardness STP/NTA (3:1) SAS | | | 5° German hardness STP FAS | | | 5° German hardness STP/NTA (3:1) FAS | | |
|---|---|---|---|---|---|---|---|---|---|---|---|---|---|---|---|---|---|---|
| | 0.2 % | 0.1 % | 0.05 % | 0.2 % | 0.1 % | 0.05 % | 0.2 % | 0.1 % | 0.05 % | 0.2 % | 0.1 % | 0.05 % | 0.2 % | 0.1 % | 0.05 % | 0.2 % | 0.1 % | 0.05 % |
| 25° C. | 0.5 | 1.5 | 0 | 0 | 0 | 0 | 1.5 | 0 | 1 | 0 | 0 | 0 | 0 | 0 | 0 | 0 | 0.5 | 0 |
| 30° C. | 0.5 | 1.5 | 0 | 0 | 0.5 | 0 | 1.5 | 0.5 | 1.5 | 0 | 0 | 0 | 0 | 0 | 0 | 0 | 0.5 | 0.5 |
| 35° C. | 1 | 2 | 0 | 0 | 0.5 | 0.5 | 2 | 1 | 2 | 0 | 0 | 0 | 0 | 0.5 | 0 | 0 | 0.5 | 0.5 |
| 40° C. | 1.5 | 2 | 0.5 | 0.5 | 1.5 | 1 | 2 | 1.5 | 2.5 | 1 | 0 | 0 | 0 | 0.5 | 0 | 0 | 1 | 1 |
| 45° C. | 2 | 2 | 1.5 | 1.5 | 2 | 1.5 | 2.5 | 2 | 3.5 | 1.5 | 0.5 | 1 | 0.5 | 1.5 | 0 | 0.5 | 1 | 1.5 |
| 50° C. | 2 | 2.5 | 3 | 2 | 3 | 2 | 3 | 2.5 | 4 | 2.5 | 1 | 2 | 1 | 1.5 | 0.5 | 0.5 | 2 | 2 |
| 55° C. | 1.5 | 2 | 4 | 2.5 | 4 | 5 | 3.5 | 2.5 | 4 | 4 | 2.5 | 3.5 | 1.5 | 1.5 | 1 | 1 | 3.5 | 2.5 |
| 60° C. | 1.5 | 1 | 4 | 3 | 4 | 6 | 4 | 3 | 4 | 5 | 4 | 5 | 1.5 | 2 | 1.5 | 1 | 4.5 | 3 |
| 65° C. | 0.5 | 0 | 4 | 2 | 3.5 | 6 | 4 | 3.5 | 4 | 4 | 5 | 5 | 1 | 2 | 1.5 | 1.5 | 5 | 4.5 |
| 70° C. | 0.5 | 0 | 5 | 1 | 2 | 3.5 | 2.5 | 3.5 | 4 | 2 | 4 | 5 | 1 | 2.5 | 2.5 | 1.5 | 5 | 5 |
| 75° C. | 0 | 0 | 5 | 1 | 1.5 | 2.5 | 1 | 2.5 | 2.5 | 1 | 2 | 3 | 1 | 2.5 | 3.5 | 1.5 | 5 | 6 |
| 80° C. | 0 | 0 | 3.5 | 1 | 1 | 2 | 0.5 | 1.5 | 2 | 1 | 1 | 2 | 0.5 | 2.5 | 4 | 1.5 | 5 | 6 |
| 85° C. | 0 | 0 | 2.5 | 0.5 | 1.5 | 2 | 0.5 | 1 | 1.5 | 0.5 | 1 | 1.5 | 0.5 | 2 | 4.5 | 1 | 5 | 6 |
| 90° C. | 0 | 0 | 2 | 1 | 1.5 | 2 | 1 | 1.5 | 2 | 0.5 | 1 | 1.5 | 1 | 1.5 | 5 | 1 | 5 | 6 |
| 95° C. | 0 | 0.5 | 3.5 | 1 | 2 | 2.5 | 1 | 1.5 | 2 | 1 | 1.5 | 1.5 | 1.5 | 1.5 | 5 | 1 | 5 | 6 |

TABLE 6

Foaming in a drum-type washing machine.
Anti-foam agents of Examples 22 to 26

| Anti-foam agent | 22 | | | | | 23 | | | | | 24 | | | | | 25 | | | | | 26 | | | | |
|---|---|---|---|---|---|---|---|---|---|---|---|---|---|---|---|---|---|---|---|---|---|---|---|---|---|
| Water hardness | 5° German hardness | | | | | 5° German hardness | | | | | 5° German hardness | | | | | 5° German hardness | | | | | 5° German hardness | | | | |
| Complexing agent | STP/NTA (3:1) | | | | | STP/NTA (3:1) | | | | | STP/NTA (3:1) | | | | | STP/NTA (3:1) | | | | | STP/NTA (3:1) | | | | |
| Surfactant | AOS | ABS | SAS | FSE | FAS | AOS | ABS | SAS | FSE | FAS | AOS | ABS | SAS | FSE | FAS | AOS | ABS | SAS | FSE | FAS | AOS | ABS | SAS | FSE | FAS |
| 25° C. | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 30° C. | 0 | 0 | 0 | 0 | 0 | 0.5 | 0 | 1 | 0 | 0 | 0 | 0 | 0.5 | 0 | 0 | 0 | 0 | 0 | 0 | 0 | 0 | 0 | 0 | 0 | 0 |
| 35° C. | 0 | 0 | 0 | 0 | 0 | 1 | 0 | 1.5 | 0 | 0 | 0 | 0 | 0.5 | 0 | 0 | 0 | 0 | 0 | 0 | 0 | 0 | 0 | 0 | 0 | 0 |
| 40° C. | 0 | 0 | 0 | 0 | 0 | 1 | 0 | 1.5 | 0 | 0 | 0.5 | 0.5 | 2.5 | 0.5 | 0 | 0 | 0 | 0 | 0 | 0 | 0 | 0 | 0 | 0 | 0 |
| 45° C. | 0 | 0 | 0 | 0 | 0.5 | 0 | 0 | 0 | 0 | 0 | 1.5 | 1 | 2.5 | 1 | 0.5 | 0 | 0 | 0 | 0 | 0 | 0 | 0 | 0 | 0 | 0 |
| 50° C. | 0 | 0 | 0 | 0 | 1 | 0 | 0 | 0 | 0 | 0 | 2 | 1.5 | 3 | 1 | 1 | 0 | 0 | 0 | 0 | 0 | 0 | 0 | 0 | 0 | 0 |
| 55° C. | 0.5 | 0.5 | 0.5 | 0 | 2 | 0 | 0 | 0 | 0 | 0 | 3.5 | 2 | 4 | 2 | 2 | 0 | 0 | 0 | 0 | 0 | 0 | 0 | 0 | 0 | 0 |
| 60° C. | 0.5 | 1.5 | 2 | 0 | 2 | 0 | 0 | 0 | 0 | 0 | 4 | 4 | 5 | 3.5 | 3 | 0 | 0 | 0 | 0 | 0 | 0 | 0 | 0 | 0 | 0 |
| 65° C. | 1.5 | 2 | 2.5 | 0 | 3.5 | 0 | 0 | 0 | 0 | 0 | 5 | 4.5 | 6 | 4 | 3.5 | 0 | 0 | 0 | 0 | 0 | 0 | 0 | 0 | 0 | 0 |
| 70° C. | 1.5 | 3 | 3.5 | 0 | 4.5 | 0 | 0 | 0 | 0 | 0 | 6 | 1 | 6 | 2.5 | 2 | 0 | 0 | 0 | 0 | 0 | 0.5 | 0 | 0.5 | 0 | 0 |
| 75° C. | 1.5 | 3.5 | 4 | 0 | 5 | 0 | 0 | 0 | 0 | 0 | 0 | 0 | 0 | 0 | 0.5 | 0 | 0 | 0 | 0 | 0 | 0.5 | 0 | 0.5 | 0 | 0 |
| 80° C. | 2 | 4.5 | 5 | 0.5 | 6 | 0 | 0 | 0 | 0 | 0.5 | 0 | 0 | 0 | 0 | 0 | 0 | 0 | 0 | 0 | 0 | 1 | 0.5 | 1 | 0 | 0 |
| 85° C. | 2.5 | 5 | 6 | 1.5 | 6 | 0 | 0 | 0 | 0 | 0.5 | 0 | 0 | 0 | 0 | 0 | 0 | 0 | 0 | 0 | 0 | 1.5 | 1 | 1.5 | 0.5 | 0 |
| 90° C. | 3 | 6 | 6 | 1.5 | 6 | 0 | 0 | 0 | 0 | 1 | 0 | 0 | 0 | 0 | 0 | 0 | 0 | 0 | 0 | 0 | 2.5 | 1 | 2 | 1 | 0.5 |
| 95° C. | 3 | 6 | 6 | 1.5 | 6 | 0 | 0 | 0 | 0 | 1 | 0 | 0 | 0 | 0 | 0 | 0 | 0 | 0 | 0 | 0 | 3 | 1.5 | 3 | 2 | 1 |

TABLE 7

Foaming in a drum-type washing machine
Detergent based on non-ionic surfactants

| Anti-foam agent | Ex. 22 | 23 | 21 | 21 | 21 | 18 | 25 | 26 | Blank value |
|---|---|---|---|---|---|---|---|---|---|
| Concentration | 1% | 1% | 1% | 0.5% | 0.2% | 1% | 1% | 1% | — |
| 25° C. | 0 | 1.5 | 1 | 1.5 | 1.5 | 1 | 1 | 1.5 | 1.5 |
| 30° C. | 0 | 2 | 1.5 | 2 | 2 | 1 | 1 | 1 | 2 |
| 35° C. | 0 | 2 | 2.0 | 2.5 | 2.5 | 1.5 | 0.5 | 0.5 | 2.5 |
| 40° C. | 0.5 | 2 | 2.0 | 2.5 | 3 | 2 | 0 | 0 | 2.5 |
| 45° C. | 0.5 | 1.5 | 2.0 | 3 | 3.5 | 2 | 0 | 0 | 2.5 |
| 50° C. | 0.5 | 0.5 | 2.0 | 3.5 | 3.5 | 2 | 0 | 0 | 3 |
| 55° C. | 0.5 | 0 | 1.0 | 3 | 4 | 2 | 0 | 0 | 3 |
| 60° C. | 1 | 0 | 0 | 2.5 | 4 | 2 | 0 | 1 | 3.5 |
| 65° C. | 1 | 0 | 0 | 1 | 3.5 | 2 | 0 | 1 | 4 |
| 70° C. | 1 | 0 | 0 | 0.5 | 2.5 | 2 | 0 | 1.5 | 4 |
| 75° C. | 1 | 0 | 0 | 0.5 | 1.5 | 2 | 0.5 | 1.5 | 5 |
| 80° C. | 1.5 | 0.5 | 0 | 0.5 | 1.5 | 2 | 1 | 2 | 6 |
| 85° C. | 1.5 | 1 | 0 | 0.5 | 1.5 | 2 | 1.5 | 2 | 6 |
| 90° C. | 1.5 | 1.5 | 0 | 1 | 1.5 | 2 | 1.5 | 2 | 6 |
| 95° C. | 1.5 | 1.5 | 0 | 1 | 1.5 | 2 | 1.5 | 2 | 6 |

TABLE 8

Foaming in a drum-type washing machine. Products of German Published Application DAS 1,257,338 and German Patent 1,617,127.

| Example | a | a | a | a | a | b | c | d | 21 | 21 | e | f | g |
|---|---|---|---|---|---|---|---|---|---|---|---|---|---|
| Product concentration | 1% | 0.5% | 0.2% | 0.1% | 0.05% | 1% | 1% | 2% | 0.1% | 0.05% | 2% | 1% | 2% |
| Water hardness | 16° d | 16° d | 16° d | 5° d | 5° d | 16° d | 16° d | 16° d | 5° d | 5° d | 16° d | 16° d | 16° d |
| Complexing agent | STP | STP | STP | STP | STP | STP | STP | STP | STP | STP | STP | STP | STP |
| 25° C. | 0 | 0 | 0 | 0 | 0 | 0 | 0 | 0 | 1.5 | 0 | 0 | 0 | 0 |
| 30° C. | 0 | 0 | 0 | 0 | 0 | 0 | 0 | 0 | 1.5 | 0 | 0 | 0 | 0 |
| 35° C. | 0 | 0 | 0 | 0 | 0 | 0 | 0 | 0 | 2 | 0 | 0 | 0 | 0 |
| 40° C. | 0 | 0 | 0 | 0 | 0 | 0 | 0 | 0 | 2 | 0.5 | 0 | 0 | 0 |
| 45° C. | 0 | 0 | 0 | 0.5 | 0.5 | 0 | 0 | 0 | 2 | 1.5 | 0 | 0 | 0 |
| 50° C. | 0 | 0 | 0 | 1 | 1 | 0 | 0 | 0 | 2.5 | 3 | 0 | 0 | 0 |
| 55° C. | 0 | 0 | 0 | 1.5 | 1.5 | 0 | 0 | 0 | 2 | 4 | 0 | 0 | 0 |
| 60° C. | 0 | 0 | 0.5 | 2 | 2 | 0 | 0 | 0 | 1 | 4 | 0 | 0 | 0 |
| 65° C. | 0 | 0 | 0.5 | 4 | 3 | 0 | 0 | 0 | 0 | 4 | 0 | 0 | 0.5 |
| 70° C. | 0 | 0 | 0.5 | 5 | 4.5 | 0 | 0 | 0 | 0 | 5 | 0.5 | 0 | 0.5 |
| 75° C. | 0 | 0 | 0.5 | 5 | 5 | 0 | 0 | 0 | 0 | 5 | 0.5 | 0 | 1.0 |
| 80° C. | 0 | 0 | 0.5 | 3 | 5 | 0.5 | 1 | 0.5 | 0 | 3.5 | 1 | 1 | 1 |
| 85° C. | 0 | 0.5 | 1 | 3 | 5 | 0.5 | 2 | 1 | 0 | 2.5 | 1.5 | 2 | 1.5 |
| 90° C. | 0 | 0.5 | 2 | 3 | 5 | 1 | 2.5 | 2 | 0 | 2 | 1.5 | 2.5 | 1.5 |
| 95° C. | 0.5 | 1.0 | 2.5 | 4 | 5 | 2 | 3 | 2.5 | 0.5 | 3.5 | 1.5 | 3.5 | 2 |

Surfactant in each case AOS = alpha-olefin-sulfonate;
STP = pentasodium triphosphate
°d = degrees German hardness

TABLE 8

Foaming in a dishwashing machine

| | Rate of revolution, rpm | | | |
|---|---|---|---|---|
| | Surfactant | | | |
| Anti-foam agent | A | B | C | D |
| — | 39 | 42 | 53 | 31 |
| 6 | 60 | 56 | 61 | 43 |

TABLE 8-continued

Foaming in a dishwashing machine

| | Rate of revolution, rpm | | | |
|---|---|---|---|---|
| | Surfactant | | | |
| Anti-foam agent | A | B | C | D |
| 21 | 74 | 58 | 73 | 56 |

A = oxo-alcohol of 9/11 carbon atoms reacted with 7 moles of ethylene oxide
B = block polymer of 60% of propylene oxide and 40% of ethylene oxide, molecular weight 3,000
C = block polymer of 80% of propylene oxide and 20% of ethylene oxide, molecular weight 2,500
D = oxo-alcohol of 13/15 carbon atoms reacted with 12 moles of ethylene oxide

TABLE 9

Foaming of cationic surfactants
Foam height in mm

| Anti-foam agent | 25° C. |
|---|---|
| — | 1,020 |
| | 900 |
| 11 | 290 |
| 10 | 720 |
| 18 | 570 |

TABLE 10

We claim:

1. A process for reducing the foaming of a detergent or rinse by adding an anti-foam agent, wherein from 0.1 to 3% by weight, based on the detergent or rinse, of one or more compounds of the formula I $$(ROCH_2)_2N-\underset{\underset{N(CH_2OR)_2}{|}}{\underset{C}{\underset{\|}{C}}}\underset{\underset{}{}}{\overset{N}{\underset{}{}}}\underset{\underset{}{N}}{\overset{C}{\underset{\|}{}}}-N(CH_2OR)_2$$

where from 25 to 100% of all radicals R are alkyl of 7 to 22 carbon atoms or acyl derived from an alkanecarboxylic acid or alkenecarboxylic acid of 7 to 22 carbon atoms and the remaining radicals R (if any) are alkyl of 1 to 4 carbon atoms, is employed as the anti-foam agent.

2. A process as set forth in claim 1, wherein theسum of the carbon atoms in all the R radicals exceeds 80.

* * * * *